United States Patent [19]

Geering et al.

[11] 3,717,682
[45] Feb. 20, 1973

[54] PROCESS OF PREPARING MERCAPTOPHENOLS

[75] Inventors: Emil J. Geering, Grand Island; George B. Stratton, Lewiston, both of N.Y.

[73] Assignee: Hooker Chemical Corporation, Niagara Falls, N.Y.

[22] Filed: May 21, 1971

[21] Appl. No.: 145,960

Related U.S. Application Data

[62] Division of Ser. No. 788,100, Dec. 30, 1968, abandoned.

[52] U.S. Cl................260/609 D, 260/470, 260/516, 260/608, 260/609 F, 260/621 H
[51] Int. Cl..............................................C07c 149/36
[58] Field of Search..........................260/608, 609 D

[56] References Cited

UNITED STATES PATENTS 3,406,158  10/1968  Brown et al. ..........................260/137

FOREIGN PATENTS OR APPLICATIONS 1,045,813  10/1966  Great Britain........................260/137

*Primary Examiner*—Lewis Gotts
*Assistant Examiner*—D. R. Phillips
*Attorney*—Peter F. Casella, Donald C. Studley, Richard P. Mueller and James F. Mudd

[57] ABSTRACT

A process is described for preparing polythiobisphenols and for converting these into mercaptophenols. The reaction between a phenol and sulfur as catalyzed by a Friedel-Crafts catalyst is interrupted before completion, and the product, a phenol polysulfide mixture is reduced to mercaptophenol. A continuous process is described wherein by-product phenol monosulfides are converted to a phenol.

14 Claims, No Drawings

PROCESS OF PREPARING MERCAPTOPHENOLS

This application is a division of application Ser. No. 788,100, filed Dec. 30, 1968 now abandoned.

This invention covers a novel process for preparing polythiobisphenols and for converting these into mercaptophenols. The reaction between a phenol and sulfur as catalyzed by a Friedel-Crafts catalyst is interrupted before completion and the product, a phenol polysulfide mixture, is reduced to a mercaptophenol. The invention also covers a continuous process for preparing polythiobisphenols by converting by-product phenol monosulfides to a phenol by hydrogenolysis.

The base catalyzed reaction between a phenol and the sulfur has been described in co-pending patent application Ser. No. 597,228 filed Nov. 28, 1966, now abandoned, and Ser. No. 666,915, filed Sept. 11, 1967, now U.S. Pat. No. 3,468,961, issued Sept. 23, 1969. These applications describe conditions for conducting the above reaction to give phenol polysulfides in which the sulfur atoms are attached primarily in positions ortho to the phenolic hydroxyls.

Less well-known is a phenol sulfur reaction as conducted under acidic conditions. A recent British Pat. No. 1,045,813, discloses sulfurized phenols formed by heating sulfur and phenol in the presence of aluminum halides, ferric chloride, zinc chloride and stannous bromide. These products contain mainly monosulfide bonds. The course of the reaction, as described in this patent, can be followed by observing the evolution of hydrogen sulfide. The reaction is terminated when this evolution ceases or when the rate has fallen to a very low figure. Under these circumstances, most of the sulfur in the sulfurized phenol will be present as monosulfide bonds.

Phenol sulfides, i.e., sulfurized phenols, containing more than one sulfur atom per sulfur bond are unsatisfactory for most applications where they must retain their molecular integrity and in which they will be subjected to heat or to the action of nucleophilic or electrophilic reagents, because of the laible nature of the polysulfide bond. Phenol monosulfides, unlike phenol polysulfides, are suitable for example, as antioxidants for polymers and as raw materials for epoxy resins. These uses are described in the cited British patent.

It has been known to employ sulfur chloride as reactant for the production of phenol sulfides in which phenol rings are linked by one or more sulfur atoms. This, thereby, involves higher manufacturing costs in the processes of this invention and are accompanied by additional problems. For example, when sulfur chloride is the initial reactant it may be more expensive than the sulfur reactant employed in the process of this invention. Further the condensation of phenol and sulfur monochloride or sulfur dichloride is accompanied by the formation of hydrogen chloride as a by-product. A process for preparing phenol sulfides which includes the condensation of phenol and a sulfur chloride must therefore include steps involving special materials of construction for handling the corrosive gas, hydrogen chloride, which is evolved during the process.

The prior art process employing sulfur chloride has a disadvantage of requiring additionally an extra step, i.e., a sulfur chlorination step to produce sulfur chlorides as well as a step for disposing of a corrosive by-product gas, HCl. Further, the employment of a sulfur halide as a reactant, in the reaction with phenol, often results in chlorinated by-products.

A further problem with the sulfur chloride reactant is the formation of a large yield of phenol monosulfide, which is not directly convertible to the desired mercaptophenol.

In J. Gen. Chem., 29, 2236-2239 (1959) a yield of about 96 percent bis(trichlorophenyl) trisulfide was obtained by employing elemental sulfur as a reagent along with sulfur chloride and trichlorobenzene catalyzed by Friedel Crafts compounds. However, this technique does not give polysulfides in a satisfactory yield when applied to a phenol. The phenol-sulfur chloride process described in U.S. Pat. No. 3,275,694 gives phenol polysulfides but requires hydrogen sulfide as a second sulfur-containing reagent.

From U.S. Pat. No. 2,937,208 and U.S. Pat. No. 3,275,694 it is known to employ Friedel-Crafts catalysts in the reaction of phenol and elemental sulfur. However, these references or other similar references whether described above or not, do not describe an interruption of the reaction in order to obtain a product which would subsequently give suitably high yields of ortho or para mercaptophenols, preferably ortho.

It is an object of this invention to produce a polysulfide compound suitable for reducing to ortho or para mercaptophenol, preferably ortho.

Another object is to obtain improved yields in the process for preparing ortho or para mercaptophenols.

It is also an object to continuously produce a polysulfide which can be converted to a mercaptophenol.

It is a further object of this invention to eliminate the undesirable use of corrosive substances such as HCl and to employ lower manufacturing costs in the production of ortho or para mercaptophenols.

The objects of this invention are achieved by heating a phenol and sulfur in the presence of a Friedel-Crafts catalyst until up to one-third of the sulfur has been expelled as hydrogen sulfide. As shown in the following equation, which is a preferred reaction, when one-third of the sulfur has been converted to hydrogen sulfide, the average sulfur bond in the organic product is a disulfide bond.

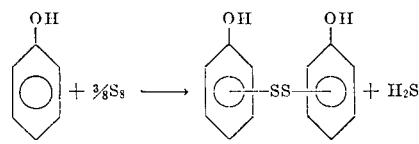

If the reaction is terminated when one-fourth of the sulfur appears as hydrogen sulfide, the average sulfur bond will be a trisulfide. Similarily one-fifth of the charged sulfur as hydrogen sulfide corresponds to a tetrathiobisphenol. These relationships are valid only when all of the charged sulfur has entered reaction.

The reaction between a phenol and sulfur results in a phenol polysulfide product as illustrated by the following formula:

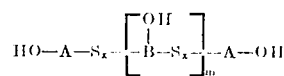

wherein A is independently selected from the group consisting of

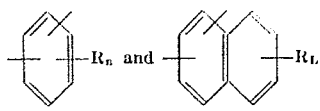

B is independently selected from the group consisting of

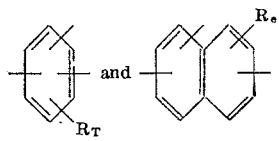

R is independently selected from the group consisting of: hydrogen; halogen; hydroxy; nitro; alkyl or alkoxy of one to 20 carbon atoms; alkene of two to 20 carbon atoms; aryloxy of six to 18 carbon atoms; cyclic alkyl of three to 20 carbon atoms; carboxy or carbalkoxy of two to 20 carbon atoms; carbaryloxy from seven to 18 carbon atoms;

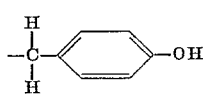

and

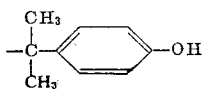

$L = 0$ to 6, $m$ is a number from 0 to about 5; $n = 0$ to 4; $T = 0$ to 3; $e = 0$ to 5; $x$ is a number from 2 to about 7.

The novel polythiobisphenols or phenol polysulfides of this invention produced from a phenol and sulfur in the presence of a Friedel-Crafts catalyst have a special utility in that they are reducible to mercaptophenols. The phenolic rings are linked by a sulfur bond containing at least two sulfur atoms in order to be reducible to mercaptophenol. Thus, thiobisphenol can not be reduced to mercaptophenol. The phenol sulfides produced as described in British Pat. No. 1,045,813 contain only minor amounts of disulfide and can be converted only in negligible yields to mercaptophenol.

Mercaptophenols are useful compounds because they have two functional groups attached to the aromatic ring. Metallic salts of ortho mercaptophenol may be used as stabilizers for plastics such as polyethylene or polyvinyl chloride. They render the plastic less amenable to degradation by light and heat. In addition phospholane derivatives can also be used as polymer stabilizers.

Friedel-Crafts catalysts are described in "Friedel-Crafts And Related Reactions" Edited by George A. Olah. "Friedel-Crafts catalysts" are generally electron acceptors, falling into the general class of acids as defined by G. N. Lewis. Further acidic catalysts of the Friedel-Crafts type can be divided into the following groups; (a) acidic halides (Lewis acids); (b) metal alkyls and alkoxides; (c) proton acids (Bronsted acids); (d) acidic oxides and sulfides (acidic chalcides); (e) cation exchange resins; (f) metathetic cation-forming agents and (g) stable carbonium and related complexes. The more commonly known Friedel-Crafts catalysts used in the reaction of a phenol and sulfur to give sulfur-rich phenol sulfides are for example, $AlCl_3$, $ZnCl_2$, $BF_3$, sulfuric acid, para toluenesulfonic acid, $SbCl_5$, $FeCl_3$, $TeCl_2$, $SnCl_4$, $TiCl_4$, $TeCl_4$, $BiCl_3$ and HF. The preferred catalysts are para toluenesulfonic acid anhydrides or monohydrate and $BF_3$ with the latter the most preferred.

The phenols that can be used in this reaction include phenol; alkylphenols having one or more side chains up to about twenty carbon atoms, such as 2,4-dioctylphenol or dodecylphenol; chloro-or bromophenols, such as, 2-4,dichlorophenol; arylphenols such as 4-benzylphenol or 4-phenylphenol;

hydroxyphenols such as catechol, alkoxy-or aryloxyphenols such as methoxy or phenoxyphenol; carboxyphenols such as salicyclic acid as well as the corresponding esters, i.e., ethyl salicylate. Other suitable phenolic reagents are the naphthols and the bisphenols typified by 4,4'-isopropylidenediphenol.

The proportions of sulfur and phenol suitable to give phenol sulfides range from about 0.3 to about 3.0 gram moles of phenol per gram atom of sulfur, preferably from about 0.3 to about 2.0. A second preferred proportion is from about 0.5 to 1.0 moles of phenol.

The quantity of Friedel-Crafts catalyst which is employed ranges from about 0.01 to about 0.5 mole per mole of phenolic compound, preferably from about 0.05 to about 0.2 mole per mole of phenol. A second preferred quantity is about 0.1 mole per mole of phenol.

The temperature employed in conducting the phenol sulfide reaction ranges from about 125° C to about 250° C, preferably about 125° to about 200° C. and even more preferably about 150° to about 175° C.

The reduction of the phenol polysulfides can be carried out by a number of methods, such as those described in co-pending applications Ser. No. 597,228, now abandoned, and Ser. No. 666,915, now U.S. Pat. No. 3,468,961, issued Sept. 23, 1969. The preferred processes are, for example, the action of metals and acid, catalytic hydrogenation or reduction employing alkali metal sulfides.

In the process of preparing o-mercaptophenol a by-product of phenol monosulfide is produced. Further during the distillation of ortho-mercaptophenol, additional phenol monosulfide is formed. These by-products of monosulfides can be converted by hydrogenolysis to phenol, a reactant, and hydrogen sulfide as described in the following reaction formulas.

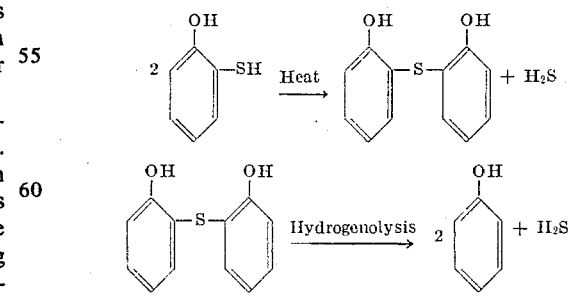

Hydrogenolysis may be effected by heating the phenol monosulfide at a temperature of about 150° C to about 250° C, under a hydrogen pressure of about 500 psi to about 3000 psi or higher in the presence of a suitable hydrogenation catalyst, such as those described above as useful in the initial reduction step.

The following examples are to illustrate the invention; all temperatures are in degrees centigrade.

EXAMPLE 1

Reaction of Phenol and Sulfur as Catalyzed by p-Toluenesulfonic Acid

A stirred mixture of 2102 g. (22.5 moles) of phenol, 480g. (15 moles) of sulfur flowers and 37.5 g. (0.197 moles) of p-toluene-sulfonic acid monohydrate was heated at 175° C for 14 hours. During this period 87.5g of hydrogen sulfide was evolved. This quantity represents 17.2 percent of the charged sulfur. The reaction was stopped and phenol, 1695g. was then removed by stripping the reaction mixture to a temperature of 150° at 15mm. pressure.

The molecular weight, as determined by vapor-phase osmometry, of the residue product was 343. The average ratio of sulfur atoms (elemental and chemically combined) to polysulfide bonds in the residue product, as calculated from the quantity of hydrogen sulfide evolved, is 4.8.

EXAMPLE 2

In a manner similar to Example 1 a mixture of ten mole quantities of phenol and sulfur was heated at 175° for ten hours in the presence of 25g. (0.131 moles) of p-toluenesulfonic acid monohydrate, which effected the evolution of 60g. of hydrogen sulfide. The product remaining after filtering off 71g. of sulfur and after stripping 633g. of phenol had a molecular weight of 437 and a sulfur content of 43.8 percent. These data correspond to the average structure:

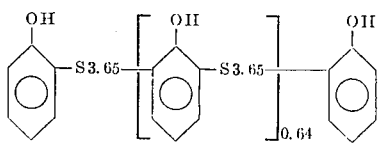

EXAMPLE 3

Conversion of a Phenol Polysulfide Mixture to Mercaptophenol

A 500g. portion of the residue product of Example 1, (corresponds to 2.79 moles of phenol) and 33g. of cobalt sulfide catalyst was stirred and heated at 125° under 1300–2200 pounds per square inch of hydrogen pressure for 15 hours, i.e., until the hydrogen pressure no longer fell. After filtering off the catalyst, the hydrogenated product was distilled. The composition of the distillate was demonstrated by gas chromatographic separation and analysis of a trimethylsilylated portion of the distillate. It contained 83.9g. of o-mercaptophenol, 11.1g. of p-mercaptophenol, 1.2g. of a material which the gas chromatographic elution time indicated to be m-mercaptophenol, and 83.8g. of phenol. These quantities represent yields of 38.6 percent of o-mercaptophenol and 5.1 percent of p-mercaptophenol. The gas chromatographic analysis was validated by a similar analysis of authentic samples of mercaptophenol.

EXAMPLE 4

Reaction of Phenol and Sulfur as Catalyzed by Boron Trifluoride

A stirred solution of 1410g. (15 moles) of phenol, 480g. (15 moles) of sulfur flowers and 7.05g. (0.104 mole) of boron trifluoride was heated at 150° until 88g. of hydrogen sulfide was evolved – which is equivalent to 17 percent of the charged sulfur. This required 2.5 hours. The reaction mixture deposited 91g. of sulfur (which was removed by filtration) during a storage period of several days. The filtrate was stripped of phenol, 911g., by distillation at 14 mm. of pressure to a temperature of 180°, leaving a residue of 792g. containing 37.3 percent sulfur. The average ratio of sulfur atoms to polysulfide bond of the residue, a phenol polysulfide, is 3.7.

EXAMPLE 5

Conversion of Phenol Polysulfide Mixture of Mercaptophenol

A 500g. portion of the residue of Example 4, which corresponds to 3.35 moles of phenol, was reduced by hydrogenation as described in Example 3. The product was separated into fractions by distillation through a 16 inch vigreux column. The fractions and their compositions as shown by gas chromatographic analysis are listed below:

FRACTIONAL DISTILLATION OF REDUCED POLYTHIOBISPHOLS (at 15 mm pressure)

| Vapor Temperature | Weight of Components (g) | | |
|---|---|---|---|
| | Phenol | Mercaptophenol | |
| | | Ortho | Para |
| 81°–90° C | 47 | 26 | - |
| 90°–121° | 10 | 58 | 3 |
| 121°–153° | - | 9 | 77 |
| Totals: | 57 | 93 | 80 |
| % Yield | | 27 | 24 |

EXAMPLE 6

Conversion of Phenol Monosulfide to Phenol

A phenol-sulfur condensation product was prepared by heating a solution of 7520g of phenol (80 moles) 1280g of sulfur flowers (40 moles) and 9.0g of sodium hydroxide at 180°–185° for 20 hours.

Unchanged phenol was stripped off under reduced pressure. The residue remained contained 15.7 percent sulfur and had a molecular weight of 248. These analyses indicate the following average structure:

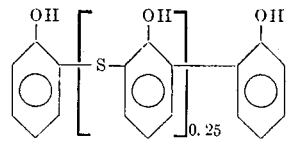

A mixture of 500g of this product and 339 of cobalt sulfide catalyst was heated at 200° under 2500 pounds/sq. in. of hydrogen. Hydrogen uptake occurred. After the pressure had fallen to about 800 pounds, the autoclave was vented to release hydrogen sulfide and then pressurized with hydrogen back to 2500 pounds. This procedure was repeated four times. The reaction mixture was filtered to remove catalyst and then distilled at 19 mm. Phenol, 331 g, was collected at 77°-95°. This corresponds to a yield of 77.5 percent.

EXAMPLE 7

Conversion of Phenol Monosulfide to Phenol

A composite of residues from several hydrogenation runs, 520 gms, containing 99.5g of sulfur was heated at 200° in the same manner as in the above example. The phenol obtained, 343g, corresponded to 80.5 percent yield.

As can be seen from the above examples phenol polysulfides and phenol monosulfides are produced from the reaction of sulfur and a phenol. These products are reduced to mercaptophenol and a residue containing phenol monosulfides. These phenol monosulfides are then converted by hydrogenolysis to a phenol which is recycled to the first stage wherein a phenol is reacted with sulfur.

What is claimed is:

1. A process for the production of mercaptophenols comprising reacting at a temperature from about 125° to about 250° centigrade sulfur with a phenol selected from the group consisting of

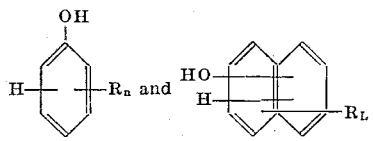

wherein R is independently selected from the group consisting of hydrogen, chlorine, bromine, hydroxy, alkyl of one to 20 carbon atoms, alkene of two to 20 carbon atoms, methoxy, phenoxy,

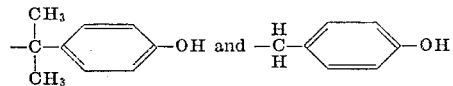

$n$ is 0 to 4 and L is 0 to 6 in the presence of a Friedel-Crafts catalyst, interrupting the reaction at any time up until approximately one third of the charged sulfur has evolved as hydrogen sulfide, thereby producing a sulfur rich phenol polysulfide having at least two sulfur atoms per linkage connecting each pair of hydroxy-substituted rings of said phenol polysulfide and reducing said phenol polysulfide with a reducing agent to produce the corresponding mercaptophenol.

2. The process of claim 1 wherein the phenol polysulfide has the formula

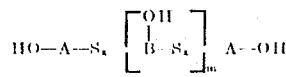

wherein A is independently selected from the group consisting of

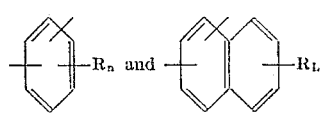

B is independently selected from the group consisting of

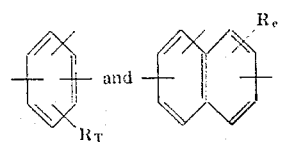

R is independently selected from the group consisting of hydrogen, chlorine, bromine, hydroxy, methoxy, alkyl of one to 20 carbon atoms, alkene of two to 20 carbon atoms, phenoxy,

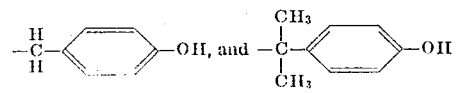

L is 0 to 6; $m$ is a number from 0 to about 5; $n$ is 0 to 4; $e$ is 0 to 5; T is from 0 to 3; $x$ is a number 2 to about 7; and the mercaptophenols are a mixture of ortho and para mercaptophenols.

3. The process of claim 2 wherein the reaction is interrupted at any time up until approximately one forth of the charged sulfur has evolved as hydrogen sulfide.

4. The process of claim 2 wherein the reaction is interrupted at any time up until approximately one fifth of the charged sulfur is evolved as hydrogen sulfide.

5. The process of claim 2 wherein the reaction is operated from about 150° to about 175° centigrade.

6. The process of claim 2 wherein the catalyst employed is boron trifluoride.

7. The process of claim 2 wherein the catalyst employed is para toluene sulfonic acid.

8. The process of claim 2 wherein the catalyst is employed in an amount of from about 0.5 to about 2.0 moles per mole of the phenol reactant.

9. The process of claim 7 wherein the mercaptophenols are a mixture comprising about 80 percent ortho mercaptophenols and about 10 percent para mercaptophenols.

10. A process for continuously producing a mercaptophenol comprising (1) reacting at a temperature from about 125° centigrade to about 250° centigrade a phenol and sulfur in the presence of a Friedel-Crafts catalyst selected from the group consisting of para toluene sulfonic acid and boron trifluoride, interrupting the reaction any time up until approximately one third of the charged sulfur has evolved as hydrogen sulfide and producing a compound of the formula

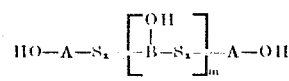

wherein A is independently selected from the group consisting of

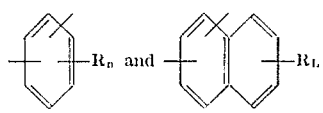

B is independently selected from the group consisting of

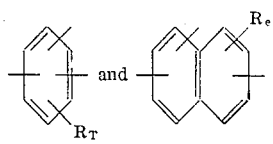

R is independently selected from the group consisting of hydrogen, chlorine, bromine, hydroxy, alkyl of one to 20 carbon atoms; alkene of two to 20 carbon atoms; methoxy and phenoxy, and

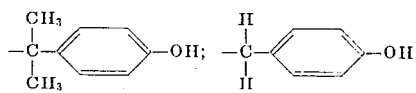

L is 0 to 6; $m$ is a number from 0 to about 5; $n$ is from 0 to 4; $e$ is from 0 to 5; T is from 0 to 3; $x$ is a number from 2 to about 7;

2. reducing the phenol polysulfide to mercapto phenol and a phenol monosulfide;
3. separating the mercapto phenol;
4. converting the phenol monosulfide to phenol; and
5. introducing the phenol from step 4 into step 1.

11. The process of claim 10 wherein steps (2) and (4) are performed by means of catalytic hydrogenation.

12. The process of claim 10 wherein the catalyst employed is boron trifluoride.

13. The process of claim 10 wherein the catalyst employed is para toluene sulfonic acid.

14. The process of claim 10 wherein the reaction is operated at from about 150° to about 175° centigrade.

* * * * *